United States Patent [19]

Longini

[11] Patent Number: 4,509,679
[45] Date of Patent: Apr. 9, 1985

[54] ENERGY USE MONITORING SYSTEM

[76] Inventor: Richard L. Longini, 6731 Forest Glen Rd., Pittsburgh, Pa. 15217

[21] Appl. No.: 494,715

[22] Filed: May 16, 1983

[51] Int. Cl.³ .......................................... G05D 23/00
[52] U.S. Cl. ...................................... 236/94; 374/42; 237/8 R
[58] Field of Search ............... 237/8 R, 8 C; 236/94; 374/41, 42

[56] References Cited

U.S. PATENT DOCUMENTS

| | | | |
|---|---|---|---|
| 4,157,034 | 6/1979 | Buchele | 374/41 |
| 4,221,260 | 9/1980 | Otala et al. | 236/94 |
| 4,245,501 | 1/1981 | Feller | 236/94 |

Primary Examiner—Henry Bennett
Attorney, Agent, or Firm—Buell, Ziesenheim, Beck & Alstadt

[57] ABSTRACT

The system includes a central fluid heater or cooler and an electrically driven centrifugal pump which pumps fluid therefrom to a supply main from which individual lines lead to each unit supplied. Return lines from each unit bring the used fluid back to the heater or cooler. The supply main is provided with a single digital flow meter or equivalent measuring device and digital thermometer. Each supply line has a control valve and means to signal the opening and closing of that valve. Each return line includes a digital thermometer. The signals from the above-mentioned apparatus are supplied to a microprocessor. The quantity of energy used by each unit is proportional to the volume of fluid received, which is metered by the change in flow when the unit valve is opened and the change in the opposite direction when the valve is closed, multiplied by the temperature difference between the received and the returned water. The microprocessor is multiplexed to monitor each unit in succession at short time intervals and make necessary calculations.

8 Claims, 3 Drawing Figures

ENERGY USE MONITORING SYSTEM

BACKGROUND OF THE INVENTION

It is common practice to construct condominiums and apartment buildings which comprise many individual units with central heating and/or cooling systems which supply hot and/or cold water or air to a number of units therein, or all of them. If the heating/cooling costs are allocated on a fixed basis there is little incentive for each tenant or owner to economize his energy use. Evidence exists, however, that aggregate energy consumption is reduced as much as 23% when each user is billed separately for the energy he consumes.

Prior to my invention to be described hereinafter, systems which permit allocation of energy cost to users on the basis of their energy usage were relatively expensive. They required at the least a flow meter for heating/cooling fluid at each unit. This requirement complicates plumbing, increases considerably the heating/cooling system first cost, as well as maintenance charges, and requires that each meter be read at regular intervals. It is the principal object of my invention to provide an energy use monitoring system free from those drawbacks.

SUMMARY OF THE INVENTION

My invention will be described hereinafter in connection with a system providing hot water for heating or cold water for cooling in air conditioning, as such systems are widely used for multiple occupancy housing. Such systems are quite generally provided with a thermostatically controlled water valve for each unit. It will be apparent, however, that my system is not limited to heat transferring liquids. For brevity, I describe my system as a heating system only, as those skilled in the art will readily understand from my description its function as a cooling system for air conditioners.

My system includes a central heater and an electrically driven pump, usually a centrifugal pump, which pumps hot water therefrom to a hot main (the header), from which the individual lines lead to each unit supplied. Return lines from each unit bring the cooled water back to the heater. My hot main or return main is provided with a single digital flow meter or equivalent digital flow measuring device. My hot main is provided with a digital thermometer. Each supply line has a control valve which is operated from within the unit supplied, preferably by a thermostat. My system requires the state of the control valve to be ascertained, which in the case of a solenoid valve, for example, is readily accomplished by monitoring the current or voltage at the solenoid. Each return line is equipped with a digital thermometer. The signals from the above-mentioned apparatus are supplied to a microprocessor. The quantity of energy used by each unit is proportional to the volume of water received, metered by the increase in flow when the unit valve is opened and the decrease when the valve is closed, multiplied by the temperature difference between the received and return water. The microprocessor notes the flow differences each time a valve is opened or closed. The difference for each unit are averaged over a considerable period of time and each unit may have a different average value, depending on the impedance of its plumbing system. The microprocessor is multiplexed to read in succession temperature differences at short regular intervals for each unit whose valve is open (thus the number of readings is proportional to the time water is flowing) and to multiply the absolute value of the flow differences average by the sum of the temperature differences. The microprocessor is programmed to eliminate from the averaging process those flow differences where two or more valves send indications of changing state at substantially the same time and more than one signal reaches the microprocessor. The microprocessor may also function as part of the flowmeter, as will appear hereinafter.

DESCRIPTION OF PREFERRED EMBODIMENTS

Figure 1:
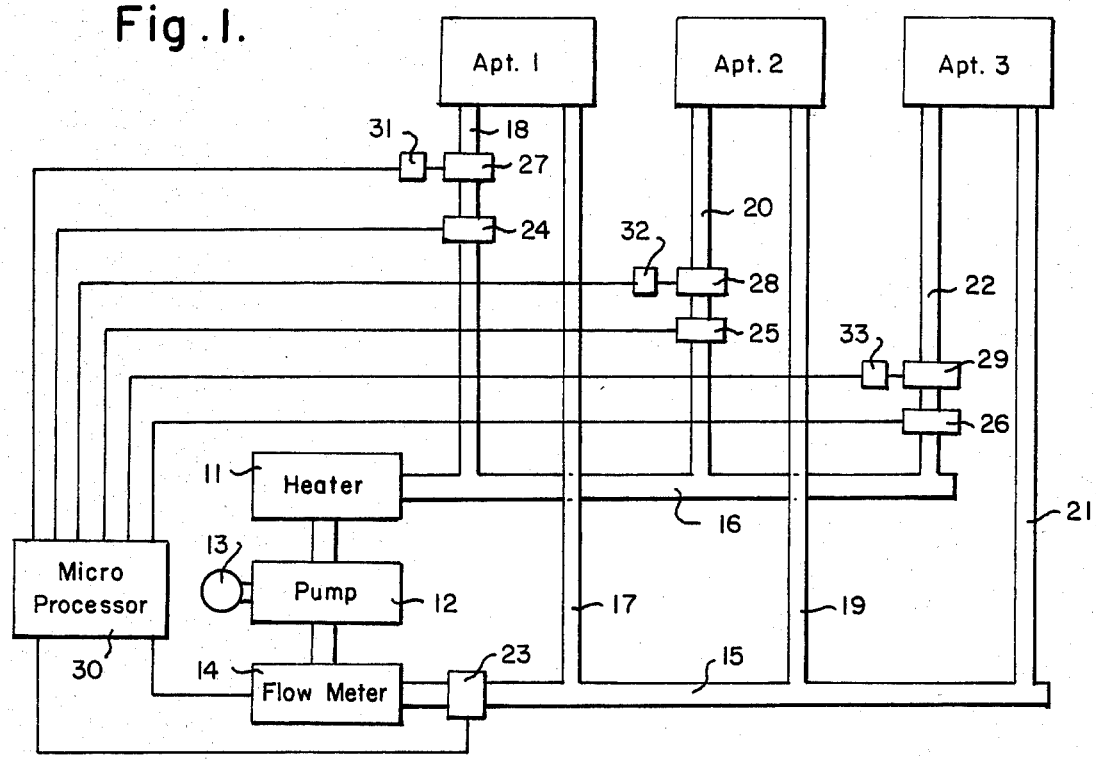
FIG. 1 is a schematic of my system employing a flow meter to measure the flow of water pumped.

In the embodiment of FIG. 1 three apartments marked apartment 1, 2 and 3 are shown heated by apparatus including my invention. A heater 11 is connected to a centrifugal pump 12 driven by a motor 13 which pumps hot water through digital flow meter 14 to a hot water main or header 15. Hot water is delivered to radiators in apartment 1 from header 15 through delivery pipe 17 and returned as cooled water to return header 16 through return pipe 18. Apartments 2 and 3 are similarly heated through delivery pipes 19 and 21 from header 15 and return cooled water through return pipes 20 and 22 respectively to header 16. Return pipes 18, 20 and 22 are each provided with control valves 27, 28 and 29 respectively. It will be understood that the pump and valves or either of them could be located either in return flow line or the header. The temperature of the hot water in header 15 is read by a digital thermometer 23. The temperature of the cooled water leaving apartment 1 through pipe 18 is read by digital thermometer 24 and the temperature of the cooled water in return pipes 20 and 22 of apartments 2 and 3 is read by digital thermometers 25 and 26. The valve 27 in pipe 18 which controls the flow of water to apartment 1 is controlled by an electrical device 31 which draws current when the valves are opened (or closed) and draws no current when the valve is closed (or opened). Device 31 indicates valve position by presence or absence of current or voltage. Like devices 32 and 33 are attached to like valves 28 and 29 in pipes 20 and 22 leading from apartments 2 and 3 respectively. Devices 31, 32 and 33 may be solenoids, motors or any other convenient means. Each of the digital thermometers 23, 24, 25 and 26 and each of the devices 31, 32 and 33 is connected to microprocessor 30. Digital flow meter 14 is likewise connected to microprocessor 30 which reads it whenever a valve opens or closes. Each digital thermometer is read every minute or so when the valve associated with its unit is open.

Figure 2:
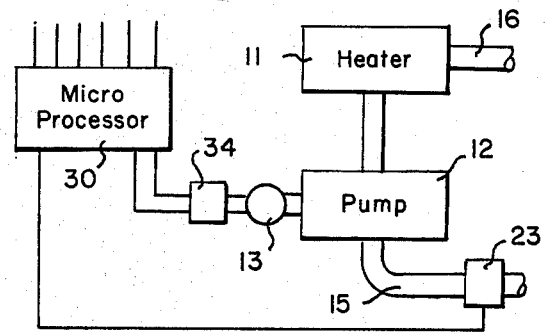
FIG. 2 is a partial schematic of a variation of the system of FIG. 1 employing a watt meter connected to the pump motor to measure the water pumped.

As I have mentioned, the heat energy furnished each apartment is proportional to the volume of heating fluid supplied to it multiplied by the difference in temperature between the heating fluid supplied and the cooled fluid returned. The volume of fluid equals the rate of flow multiplied by the time of flow. The time of flow is approximated by the number of temperature readings made when the valves are opened. Thus the combined products are produced approximately by the indicated operations. It is not essential that a conventional flow meter be employed to measure the volume of heating fluid delivered. FIG. 2 illustrates an alternative arrangement of that portion of my apparatus, which requires no flow meter as such. Centrifugal pumps such as pump 12 are essentially constant pressure output systems which deliver fluid at a constant pressure. In such a system the power consumed by the pump motor 13 increases almost exactly linearly with the volume of the water pumped; i.e., the power consumption of the pump is given approximately by the equation:

$$W = A + BV$$

where W is the wattage, A and B are pump constants, and V is the volume pumped. Thus the flow to an indicated apartment is determined by subtracting from the power required by pump motor 13 when the control valve for any individual apartment is opened the power required by the motor when that valve is closed. The motor power is measured by digital watt meter 34, the reading of which is supplied, whenever a valve changes state, to microprocessor 30.

Figure 3:
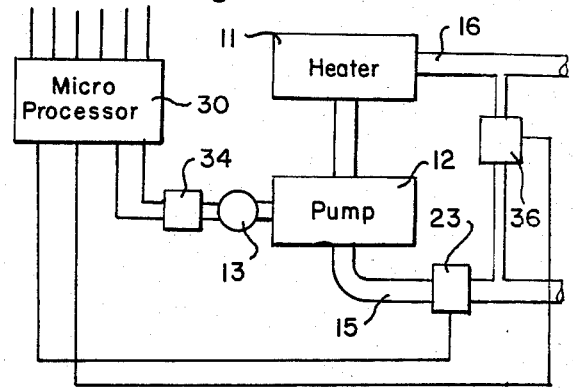
FIG. 3 is a partial schematic of another variation of the system of FIG. 1 including a digital reading differential pressure meter at the pump.

In a simple system it is probably adequate to assume that the hot water pumping system produces a constant pressure. No real pump is so ideal, however, and depending on both the deviation from ideal and the precision desired, correction means can be utilized. If, for example, the pressure drops when an apartment valve opens, the flow in all the previously opened valves will decrease slightly so that the flow through the just opened valve is the sum of the additional flow plus the amount of decrease through the previously open systems. This can easily be corrected by the microprocessor in at least two ways: 1st, the pump characteristics could be known by separate earlier testing so that increases in flow and decreases in pressure could be built into the microprocessor program; 2nd, a separate digital pressure meter 36, could be used to measure the difference in pressure produced by the pump, as is shown in FIG. 3. An approximate correction factor g, which is usually positive, is:

$$g = DP/DV$$

where DP is the decrease in pressure P when the total pump volume increases by DV. The flow through the radiators of apartment n when valve n opens is thus approximately $$V_{(n)} = (1 + gV/P)DV.$$

When the pressure produced is a function of flow there will be a correction needed when measuring flow by drive motor power consumption. This can be either known ahead of time or computed by simple theory; one program or the other being written into the microprocessor firmware.

Microprocessor 30 takes readings of each apartment at intervals of a minute or so. As only a single flow measuring device is used, the times of opening and closing of the valve to each apartment must be assigned unambiguously to the proper apartment. This requires that if two valves open or close at about the same time no signal shall be accepted by the microprocessor for purposes of average flow. This function is accomplished by including a timing device in the microprocessor which device rejects any signals which are too closely spaced in time. This time spacing limit is set by the valve operation-water inertia system; the time required for that system to reach steady state.

The microprocessor reads the change in flow or change in power demand when the valve for each unit opens or the change (in the opposite direction) when that valve closes. The magnitudes of those flow or power differences are averaged by the microprocessor over one or more billing periods, such as a month, to determine the flow characteristics of each unit. The microprocessor subtracts the return line temperature for each unit from the hot water main temperature at short intervals and sums those differences over the billing period; then multiplies that sum for each unit by the average flow or power differences for each unit. Preferably the microprocessor prints out the products for each unit, for the total system, and the fraction of the total used by each unit.

It will be seen from the foregoing description that my system minimizes the plumbing in an apartment or other multiple occupancy building or complex including a central heating/cooling installation but makes possible individual billing of each occupant for the energy used. My system furthermore can dispense with a flow meter as such, by metering the power consumed by the motor driving the pump, such as a centrifugal pump.

If the digital watt meter 34 employed to measure pump motor power as mentioned hereinabove is of the type making use of a microprocessor my microprocessor 30 may be utilized for that purpose as well as the other purposes there set out.

In the claims which follow reference is made only to a heating system but it will be understood that my system operates exactly the same way when it provides cold water or other fluid for air conditioning. Therefore, the terms "heat", "heater", "heating", "hot" and "cooled" in the claims also comprehend their respective opposites. Likewise, although I have described my invention herein as employing digital measuring devices, analog devices may be used together with suitable analog-to-digital converters, and the term "digital" in the following claims includes such arrangements.

I claim:

1. In a central heating system for a multiple unit building including a central heater, heating fluid delivery and return lines between the heater and each unit, a control valve for each unit in those lines and a motor driven pump connected to circulate fluid from the heater in those lines, the improvement comprising single digital flow measuring means connected to measure the aggregate flow of heating fluid in those lines to at least several of those units, digital temperature measuring means connected to measure the temperature of the heating fluid leaving the heater, separate digital temperature measuring means connected to measure the fluid temperature in each measured unit heating fluid return line, means for signalling the open or closed state of each measured unit control valve, and a digital microprocessor connected with the single digital flow measuring means, each measured unit digital temperature measuring means and each measured unit valve signalling means, arranged to measure the change in heating fluid flow when a control valve is opened or closed, the temperature differences at short regular time intervals between the heating fluid leaving the heater and the fluid in the heating fluid return line measured unit when its control valve is opened, and to multiply said changes in flow in each measured unit by said temperature differences for that unit.

2. Apparatus of claim 1 in which the microprocessor is arranged to obtain the average of absolute values for each measured unit over a predetermined period of the changes in heating fluid flow when a control valve is opened or closed, and to multiply said average change in flow for each measured unit by the said temperature difference for that unit.

3. Apparatus of claim 1 in which the microprocessor is arranged to sum the said temperature differences between the heating fluid leaving the heater and the fluid in the heating fluid return line from each measured unit and to multiply said changes in flow in each measured unit by said sum of temperature differences for that unit.

4. Apparatus of claim 1 in which the pump is a centrifugal pump.

5. Apparatus of claim 4 in which the digital flow measuring means comprise a digital watt meter connected with the pump motor.

6. Apparatus of claim 5 in which said digital watt meter is connected with said microprocessor so as to require no other microprocessor.

7. Apparatus of claim 1 including a digital differential pressure meter connected to measure the difference in pressure between heating fluid leaving the heater and heating fluid returning thereto, and connected with said microprocessor.

8. Apparatus of claim 1 in which the microprocessor is arranged to cancel all signals received by it from two or more valve signalling means within a predetermined time interval.

* * * * *

UNITED STATES PATENT AND TRADEMARK OFFICE
CERTIFICATE OF CORRECTION

PATENT NO. : 4,509,679
DATED : April 9, 1985
INVENTOR(S) : RICHARD L. LONGINI

It is certified that error appears in the above-identified patent and that said Letters Patent is hereby corrected as shown below:

On the title page;
In the ABSTRACT, second column, fourth line from last, after and, delete "the".

Column 1, after the title, insert the following paragraph:
--This invention has to do with an improved energy use monitoring system. It is more particularly concerned with apparatus and method for determining the energy consumed in heating or cooling each individual unit in a condominium or apartment building having a central heating and/or cooling facility supplying those several units.--

Column 1, line 43, delete "the".

Column 1, line 63, change "difference" to --differences--.

Column 4, line 8, change "or" to --and--.

Column 4, line 17, change "differences" to --differenc‹

Signed and Sealed this

Twenty-third Day of July 1985

[SEAL]

Attest:

DONALD J. QUIGG

Attesting Officer  Acting Commissioner of Patents and Trademarks